US008043746B2

(12) United States Patent
Masson et al.

(10) Patent No.: US 8,043,746 B2

(45) Date of Patent: Oct. 25, 2011

(54) ELECTRICAL CONNECTION FOR A STORAGE CELL

(75) Inventors: Olivier Masson, St Vincent de Paul (FR); Gerard Rigobert, Fargues St Hilaire (FR); Christian Vezat, St Jean d'Illac (FR)

(73) Assignee: SAFT, Bagnolet (FR)

( * ) Notice: Subject to any disclaimer, the term of this patent is extended or adjusted under 35 U.S.C. 154(b) by 60 days.

(21) Appl. No.: 12/360,253

(22) Filed: Jan. 27, 2009

(65) Prior Publication Data

US 2009/0214943 A1 Aug. 27, 2009

(30) Foreign Application Priority Data

Feb. 22, 2008 (FR) ..................................... 08 00959

(51) Int. Cl.
*H01M 2/26* (2006.01)
*H01M 2/22* (2006.01)

(52) U.S. Cl. ....................................... 429/211; 429/178

(58) Field of Classification Search ........................ None
See application file for complete search history.

(56) References Cited

U.S. PATENT DOCUMENTS

| | | | | |
|---|---|---|---|---|
| 5,773,164 | A | 6/1998 | Venkatesan et al. | |
| 2001/0023038 | A1* | 9/2001 | Ligeois et al. | 429/161 |
| 2003/0188901 | A1* | 10/2003 | Ovshinsky et al. | 180/65.2 |
| 2004/0247998 | A1* | 12/2004 | Nakanishi et al. | 429/161 |
| 2005/0008933 | A1* | 1/2005 | Ligeois et al. | 429/161 |

FOREIGN PATENT DOCUMENTS

| | | | |
|---|---|---|---|
| EP | 0 491 959 | A1 | 7/1992 |
| EP | 1 134 820 | A1 | 9/2001 |
| FR | 2 853 764 | A1 | 10/2004 |
| JP | 03-106582 | A | 5/1991 |

* cited by examiner

*Primary Examiner* — John S Maples
(74) *Attorney, Agent, or Firm* — Sughrue Mion, PLLC

(57) ABSTRACT

An electrical storage cell is provided comprising a container (2) carrying an electrode plate group (9) comprising alternating positive and negative electrodes flanking electrolyte-impregnated separators, a current output terminal (7) passing through a wall (5) of the container, and an internal connection part (20) electrically connecting the electrodes of one polarity to the terminal passing through a wall of the container, in which the internal connection part is of copper with at least one copper/nickel co-laminated portion (25, 26), eliminating the need for supplementary welding parts employed for welding the copper internal connection.

5 Claims, 2 Drawing Sheets

20

25

ELECTRICAL CONNECTION FOR A STORAGE CELL

This application is based on French No. 08 00 959, filed Feb. 22, 2008

BACKGROUND OF THE INVENTION

The present invention relates to an electrical connection between a current output terminal and the electrodes of one polarity of an electrode plate group in an electrical storage cell.

An electrochemical cell or storage cell (these two terms being equivalent, the term storage cell will be used hereinafter) is a device for producing electricity in which chemical energy is converted into electrical energy. The chemical energy is constituted by electrochemically active compounds deposited on at least one face of electrodes arranged in the storage cell. The electrical energy is produced by electrochemical reactions during discharge of the storage cell. The electrodes, arranged in a container, are electrically connected to current output terminals to provide electrical continuity between the electrodes and an electrical consumer with which the storage cell is associated. The positive and negative current output terminals can be secured either onto the walls of opposing sides of the container of the storage cell, or onto the wall of a same side of the container.

FIG. 1 shows a sealed cylindrical storage cell of a known type.

Storage cell 1 comprises an electrode plate group 9 comprising alternating positive and negative electrodes flanking electrolyte-impregnated separators. Typically, each electrode is made up by a metal current collector also called a foil, carrying on at least one face thereof, the electrochemically active matter. The electrode plate group 9 is arranged in a sealed container 2 having a cylindrical wall closed off by a base 3 at one end thereof and covered at the other end by a lid 5 which carries the current output terminals 6 and 7. A first current output terminal, in the example the positive terminals 6, is generally welded onto the lid. A second current output terminal, in the example the negative terminal 7, passes through the lid; it is generally secured onto the latter by crimping, with seals 8 electrically insulating the negative current output terminal 7 from the lid 5.

The current output terminals 6, 7 provide electrical continuity between the electrodes and the external application with which the storage cell is associated. There exist several ways of electrically connecting the electrodes of a given polarity to one of the current output terminals on the container. One possible solution consists in employing a flat connection applied onto the collectors of the electrodes having the same polarity. This known solution is illustrated on FIG. 1; a flat connection 11 connects the positive electrodes of electrode plate group 9 together, and a conducting shaped part 12 connects this flat connection 11 to the bottom wall 3 of the container, the walls of the container being electrically conducting with the lid 5 and the positive terminal 6 welded onto the lid. Similarly, a flat connection 13 connects the negative electrodes of electrode plate group 9 together, and an elongated tab 14 connects this flat connection 13 to the negative current output terminal 7. Elongated tab 14 can form at least one bend in order to impart an elastic effect to the electrical connection between the negative electrodes and the negative current output terminal, and which compensates for variation in height of electrode plate groups from one storage cell to another.

Typically, the electrical connection to the terminal passing through a wall of the container—in the example of FIG. 1 this is the negative terminal—is assembled in the following way. Flat connection 13 is welded onto the collectors of the electrodes of a given polarity after which the elongated tab 14 is welded onto the flat connection 13 and onto the lower portion of the terminal 7 passing through a wall of the container. The elongated tab 14 is then bent inside the storage cell while the container 2 is being closed by the lid 5. An internal connection of this type is notably disclosed in European patent applications EP-A-1,102,337 or EP-A-1,596,449.

For high power applications, it is necessary to provide for heavy currents through the connections of the storage cell, for example currents greater than 100 amps. The choice will then fall on materials of high conductivity such as copper or aluminum to provide the connections. Typically, the negative electrode straps are of copper and the positive electrode straps are of aluminum for reasons of compatibility with the active matter, notably for lithium-ion type storage batteries. Thus, in lithium ion technology, the positive terminal is generally connected to the container of aluminum and the negative terminal is generally a terminal passing through a wall of the container and of copper. Copper is also generally chosen for flat connection 13 and elongated tab 14 to ensure good conduction of heavy currents and compatibility with the negative terminal of copper. It should be noted that flat connection 13 and elongated tab 14 may be one and the same part with a suitable shape which is directly welded onto the collectors of the electrodes that are folded as disclosed in European patent application EP-A-1,596,449.

The internal connection part (single part or elongated tab 14 welded to a flat connection 13) needs to be welded to the collectors of the negative electrodes of copper and then to the foot of the terminal 7 passing through a wall of the container. With lithium ion technology, the welds are typically performed by laser. Now, laser welding is not effective on copper as the laser beam is naturally reflected by copper. To get around this phenomenon, it is known to employ a nickel plate that is inserted between the copper and the laser beam in order to as it were "cheat" the laser and get it to transmit the laser heat energy to the copper to be welded. Welding the internal connection part consequently necessitates three parts: the actual connection part, a nickel welding plate to be placed against the portion to be welded to the collectors and a nickel welding plate to be placed on the portion to be welded at the foot of the terminal passing through a wall of the container.

It is also known, notably from European patent application EP-A-1,596,4496, to employ an internal connection part of nickel-plated copper. The nickel coating, several microns thick, is applied to prevent any oxidation of the copper part, and is not thick enough to sink the laser energy during welding. Supplementary parts for welding in nickel should always be employed with a connection part in nickel-plated copper.

FIG. 2 shows such an internal connection according to the prior art.

FIG. 2 shows diagrammatically the upper portion of an electrode plate group 9 to which an internal connection part 20 has been welded. It will be noticed in FIG. 2 that connection part 20 is covered by a nickel plate 21 over the portion which was welded to electrode plate group 9. The free end of this internal connection 20 is designed to electrically connect the foot of the terminal passing through the lid of the container when the electrode plate group will be introduced into the container (not illustrated). It will be also noticed in FIG. 2 that connection part 20 is covered by another nickel plate 22 over the portion which is to be welded to the foot of the terminal passing through a wall of the container. FIG. 2 also shows an exploded view of the three parts: internal connection part 20 and the two welding plates 21, 22.

Managing these three parts simultaneously complicates the manufacturing procedure for the storage cell, and represents a cost. Further, the nickel plates of around 0.5 mm thickness then remain inside the cell, although their only purpose is the welding of the internal connection. Now, the goal is to provide cells which are even more compact and lightweight; one consequently seeks to eliminate any part which plays no role in the operation of the cell.

There is consequently a need for a simplified internal electrical connection part which allows welding without the use of supplementary parts while still preserving low resistance to ensure passage of heavy currents.

SUMMARY OF THE INVENTION

More particularly, the invention provides an electrical storage cell comprising:

- a container containing an electrode plate group comprising alternating positive and negative electrodes flanking electrolyte-impregnated separators;
- a current output terminal passing through a wall of the container;
- an internal connection part electrically connecting the electrodes of one polarity to the terminal passing through a wall of the container, said internal connection being of copper with at least one copper/nickel co-laminated portion.

In various embodiments, the storage cell according to the invention can further comprise one or more of the following features:

- the internal connection part comprises two copper/nickel co-laminated portions.
- the internal connection part is entirely copper/nickel co-laminated.
- a copper/nickel co-laminated portion of the internal connection part is a portion designed to be welded to the electrodes of one of the polarities of the electrode plate group.
- a copper/nickel co-laminated portion of the internal connection part is a portion designed to be welded to the terminal passing through a wall of the container.
- the internal connection part has a substantially constant thickness.
- the nickel layer of the internal connection part has a thickness comprised between 0.1 mm and 0.3 mm.

Further characteristics and advantages of the invention will become more clear from the description which follows provided by way of example and with reference to the attached drawings.

DETAILED DESCRIPTION OF PREFERRED EMBODIMENTS

Figure 1:
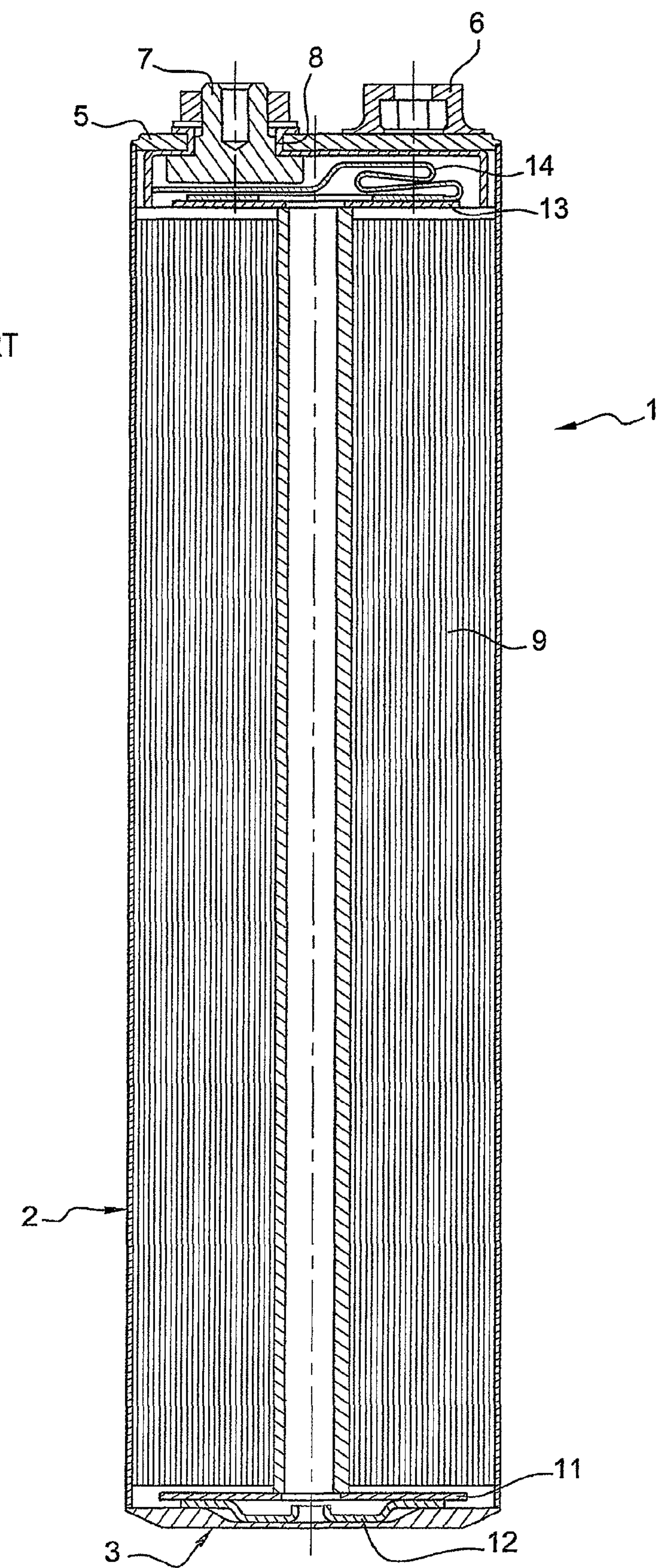
FIG. 1, already described, shows a longitudinal cross-section of a sealed cylindrical cell of the prior art.
Figure 2:
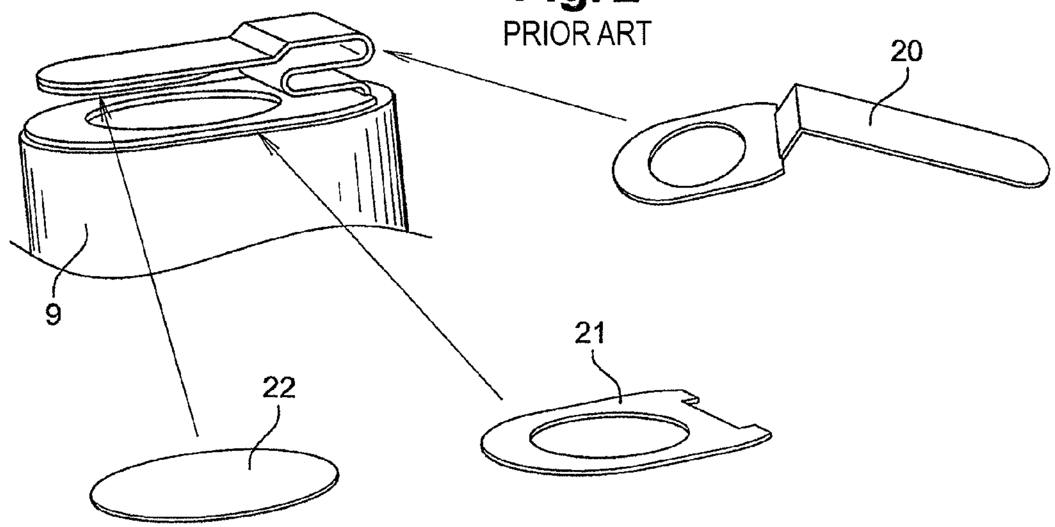
FIG. 2, already described, shows an internal electrical connection welded to an electrode plate group according to the prior art.

The invention provides a sealed cell 1 comprising a simplified internal electrical connection part. The cell of the invention comprises a container 2 containing an electrode plate group 9 and current output terminals 6, 7, with a positive terminal 6 having the same polarity as the wall of the container and a negative terminal 7 passing through the wall of the container. An internal connection part 20 electrically connects the negative electrodes of the electrode plate group to the current output terminal 7 that passes through a wall of the container.

Figure 3:
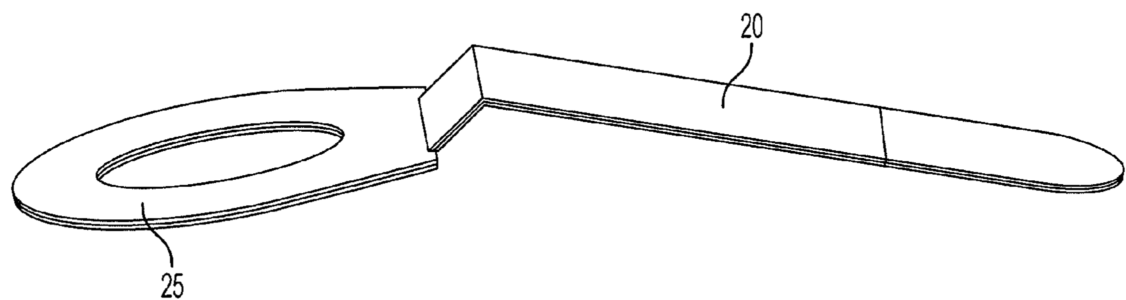
FIG. 3 shows an internal electrical connection according to the invention.

According to the invention, the internal connection part 20 is of copper and has a least one copper/nickel co-laminated portion. Internal connection part 20 can have two copper/nickel co-laminated portions as in FIG. 3 or be entirely copper/nickel co-laminated. On FIG. 3, internal connection part 20 has a copper/nickel co-laminated portion 25 on the portion which is to be welded to the electrode plate group and a copper/nickel co-laminated portion 26 on the portion which is to be welded to the foot of the terminal passing through a wall of the container.

Internal connection part 20 according to the invention allows laser welding with the electrode plate group and the current output terminal without supplementary parts since the thermal energy of the laser will be absorbed by the nickel layer. The weld will nevertheless be strong and clean since connection part 20 will be welded by its copper layer to the copper collectors and to the negative terminal of copper.

Internal connection part 20 of the invention also allows passage of heavy currents for power applications. Internal resistance of a cell with an internal connection part 20 according to the invention was measured and compared to the internal resistance of a prior art cell with a connection part entirely of copper. The internal resistance of the cell according to the invention is substantially the same as the internal resistance of a cell with a connection entirely of copper.

Internal connection part 20 can be made by drawing a nickel sheet laminated onto a shaped copper elongate tongue. Internal connection part 20 has substantially constant thickness over its whole length, of the order of 0.5 mm to 1 mm. The nickel layer laminated onto the copper internal connection part has a thickness of the order of 0.1 mm to 0.3 mm. Such a nickel thickness is sufficient to “cheat” the laser during copper to copper welding and is sufficiently low not to reduce by too much the thickness of the copper connection, which would have the effect of increasing electrical resistance of the connection part.

A gain that has been achieved is in the thickness of prior art nickel plates, making for cells which are more compact and lightweight. Cell manufacturing cost has also been able to be reduced since one single part is employed for the internal connection.

Further, internal connection part 20 of the invention considerably facilitates production of the cell of the invention. In effect, cell assembly can be fully automated, at least up until bending of the internal connection part when the lid is being closed.

The embodiments discussed above and the drawings should be considered as having been provided by way of non-limiting example, and the invention is not intended to be limited to the details provided here but can be modified while still remaining within the scope of the attached claims. In particular, the invention concerns any type of storage battery whether it be prismatic, cylindrical or concentric; or whether it is of the lithium-ion, nickel cadmium or nickel metal hydride type. Even though the internal connection part according to the invention has been described with reference to a connection to the negative terminal of the cell, technologies can be envisaged in which a terminal of copper colaminated with nickel according to the invention could be employed with the positive terminal.

The invention claimed is:

1. An electrical storage cell comprising:

a container containing an electrode plate group comprising alternating positive and negative electrodes flanking electrolyte-impregnated separators;

a current output terminal passing through a wall of the container;

an internal connection part electrically connecting the electrodes of one polarity to the terminal passing through a wall of the container, said internal connection being made of copper with at least one portion being made of copper with a co-laminated layer of nickel so as to define a copper/nickel co-laminated portion, wherein the internal connection part has a thickness between 0.5 mm and 1 mm, and wherein the nickel layer has a thickness between 0.1 mm and 0.3 mm.

2. The storage cell according to claim 1, in which the internal connection part comprises another portion made of copper with another co-laminated layer of nickel.

3. The storage cell according to claim 1, in which the copper/nickel co-laminated portion of the internal connection part is a portion designed to be welded to the electrodes of one of the polarities of the electrode plate group.

4. The storage cell according to claim 1, in which the copper/nickel co-laminated portion of the internal connection part is a portion designed to be welded to the terminal passing through a wall of the container.

5. The storage cell according to claim 1, in which the internal connection part has a substantially constant thickness.

* * * * *